Patented Oct. 19, 1943

2,331,995

UNITED STATES PATENT OFFICE 2,331,995

ALDEHYDE-AMINOTHIAZOLINE REACTION PRODUCT

Roger A. Mathes, Akron, Ohio, assignor to The B. F. Goodrich Company, New York, N. Y., a corporation of New York No Drawing. Application April 17, 1942, Serial No. 439,385

11 Claims. (Cl. 260—302)

This invention relates to a composition of matter and pertains specifically to the reaction products of aminothiazolines with aldehydes.

The compositions which are the subject of this invention are of particular value as accelerators for the vulcanization of rubber, although they may also be used as insecticides, fungicides, etc. Among the rubbers with which my new accelerators may be used are all varieties of natural rubber such as caoutchouc, balata, gutta percha, latex, reclaimed rubber, artificial rubber isomers, and such synthetic rubbers as can be vulcanized with sulfur, such as copolymers of butadiene, isoprene, 2,3-dimethyl butadiene, piperylene, and the like with acrylonitrile, styrene, methyl acrylate, methyl methacrylate, isobutylene, and other copolymerizable monomers. These new accelerators may be added to the rubber on a roll mill or in an internal mixer or by any other suitable method. The presence of other compounding ingredients, such as any of the ordinary pigments, fillers, dyes, antioxidants, or other accelerators has no deleterious effect upon the accelerating properties of my new materials.

My new products are prepared by reacting a 2-aminothiazoline with from one to two molecular proportions of an aldehyde. By the term "a 2-aminothiazoline" is meant a compound having the following formula

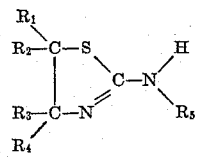

where $R_1$, $R_2$, $R_3$, and $R_4$ may be hydrogen, hydrocarbon, or alkoxy groups, and $R_5$ may be hydrogen or hydrocarbon groups. The two nuclear carbon atoms may be connected to the ends of a hydrocarbon chain, as for example in the 4,5-cyclotetramethylene thiazolines. Although the hydrocarbon groups, which may be aromatic, aliphatic, or cycloaliphatic, saturated or unsaturated, may contain various substituent groups, such as nitro, halo, ether, thioether, etc., groups, they are preferably unsubstituted. Suitable compounds comprise 2-aminothiazoline, 2-amino-4-methylthiazoline, 2-amino-5-methylthiazoline, 2-amino-4,5-diethylthiazoline, 2-amino-4-methoxythiazoline, 2-amino-5-methoxythiazoline, 2-amino-4-ethoxythiazoline, 2-amino-4-phenylthiazoline, 2-amino-5-phenylthiazoline, and other similar compounds. Also included are analogous compounds in which one of the amino hydrogen atoms has been replaced by such a group as methyl, ethyl- n-propyl, n-butyl, i-butyl, phenyl, p-tolyl, naphthyl, benzyl, cyclohexyl, and the like. Two amino-thiazolinyl groups may be present in a single molecule, as for example in N,N'-dithiazolinyl-2,2'-diaminodiethyl sulfide and similar compounds. The aldehydes which may be used comprise aliphatic and aromatic aldehydes such as formaldehyde, acetaldehyde, propionaldehyde, n-butyraldehyde, isobutyraldehyde, n-valeraldehyde, n-capronaldehyde, n-heptaldehyde, acrolein, crotonaldehyde, alpha, beta-dimethylacrolein, benzaldehyde, cinnamaldehyde, p-tolylaldehyde, o-tolylaldehyde, and the like. Although all of the foregoing aldehydes give satisfactory results, it is preferred to use aliphatic aldehydes containing four carbons or less.

The mechanism of the reaction and the structure of the products are not fully understood; however, it is believed that the aldehyde reacts with the amino hydrogen. Either one or two moles of aldehyde may be used for each mole of a 2-aminothiazoline containing two amino hydrogen atoms; one mole of aldehyde may be used for each mole of a 2-aminothiazoline containing only one amino hydrogen atom.

In order more fully to describe the products and the method of preparing them, the following specific examples are given.

Example I

To 276 parts by weight of formalin (a 37.5% solution of formaldehyde in water) was added about 153 parts of 2-aminothiazoline, which was readily soluble in the formalin solution. A reaction took place immediately, with the formation of a heavy precipitate. After standing for about an hour at room temperature, the mixture was heated to drive off the water and the excess formaldehyde. The product was a brittle, colorless, resin-like material, insoluble in water, which could be ground to a white powder.

Example II

About 102 parts by weight of 2-aminothiazoline was dissolved in about 320 parts by weight of ethyl alcohol. To this solution was added about 116 parts of propionaldehyde, and the reaction mixture was refluxed for about twenty minutes. After cooling for a few hours, the alcohol was removed by warming the mixture under reduced pressure. About 200 parts by weight of a viscous syrup, light yellow in color, was obtained.

Example III

About 51 parts by weight of 2-aminothiazoline and 80 parts of n-butyraldehyde were dissolved in 400 parts of ethyl alcohol, and the mixture was heated to reflux temperature for a few minutes. After cooling for several hours, a viscous syrup separated from the solution. The mixture was warmed under reduced pressure to remove the alcohol and any excess aldehyde. About 115 parts by weight of a viscous syrup was obtained.

Similar results can be obtained with other 2-aminothiazolines and aldehydes. The temperature at which the reaction is carried out is not critical. The reaction proceeds rather slowly at room temperature, and quite rapidly at temperatures about 50° or 60° C. It is usually desirable to have present a diluent or solvent for the reagents. In some cases an excess of the aldehyde may be a suitable diluent, but usually water, alcohol, acetone, or the like is preferable.

As has been previously stated, as little as one molecular proportion of aldehyde will give a product with one molecular proportion of a 2-aminothiazoline, but up to two molecular proportions of the former may be used if two amino hydrogens are present in the aminothiazoline.

All of the products of my invention have valuable accelerating properties for the vulcanization of rubber, producing rubber compositions having high tensile strength.

Although I have herein described specific examples of my invention, I do not intend to limit myself solely thereto, but to include all modifications embraced in the scope of the appended claims.

I claim:

1. The reaction product of a 2-aminothiazoline containing at least one amino hydrogen atom in which the amino nitrogen is connected directly to the thiazoline ring at the 2-position with an aldehyde.

2. The reaction product of a 2-aminothiazoline containing at least one amino hydrogen atom which, except for the nitrogen of the amino group and the nitrogen and sulfur of the thiazoline ring, consists of carbon and hydrogen and is free of aromatic rings and in which the amino nitrogen is connected directly to the thiazoline ring at the 2-position, with an aldehyde.

3. The reaction product of a 2-aminothiazoline containing at least one amino hydrogen atom in which the amino nitrogen is connected directly to the thiazoline ring at the 2-position, with an aliphatic aldehyde.

4. The reaction product of a 2-aminothiazoline containing at least one amino hydrogen atom in which the amino nitrogen is connected directly to the thiazoline ring at the 2-position, with an aliphatic aldehyde containing not more than four carbon atoms.

5. The reaction product of a 2-aminothiazoline containing at least one amino in which the amino nitrogen is connected directly to the thiazoline ring at the 2-position, hydrogen atom with an aromatic aldehyde.

6. The reaction product of a 2-aminothiazoline containing at least one amino hydrogen atom which, except for the nitrogen of the amino group and the nitrogen and sulfur of the thiazoline ring, consists of carbon and hydrogen and is free of aromatic rings, and in which the amino nitrogen is directly connected to the thiazoline ring at the 2-position, with an aliphatic aldehyde.

7. The reaction product of a 2-aminothiazoline containing at least one amino hydrogen atom which, except for the nitrogen of the amino group and the nitrogen and sulfur of the thiazoline ring, consists of carbon and hydrogen and is free of aromatic rings, and in which the amino nitrogen is directly connected to the thiazoline ring at the 2-position, with an aliphatic aldehyde containing not more than four carbon atoms.

8. The reaction product of a 2-aminothiazoline containing at least one amino hydrogen atom which, except for the nitrogen of the amino group and the nitrogen and sulfur of the thiazoline ring, consists of carbon and hydrogen and is free of aromatic rings, and in which the amino nitrogen is directly connected to the thiazoline ring at the 2-position, with an aromatic aldehyde.

9. The reaction product of 2-aminothiazoline with formaldehyde.

10. The reaction product of 2-aminothiazoline with propionaldehyde.

11. The reaction product of 2-anilinothiazoline with formaldehyde.

ROGER A. MATHES.